United States Patent
Bonardi et al.

(10) Patent No.: US 10,648,923 B2
(45) Date of Patent: May 12, 2020

(54) DEVICE FOR THE CONTINUOUS QUALITY CONTROL OF CONTAINERS

(71) Applicant: ANTARES VISION S.P.A., Brescia (IT)

(72) Inventors: Massimo Bonardi, Brescia (IT); Emidio Zorzella, Brescia (IT)

(73) Assignee: ANTARES VISION S.P.A., Brescia (IT)

( * ) Notice: Subject to any disclaimer, the term of this patent is extended or adjusted under 35 U.S.C. 154(b) by 0 days.

(21) Appl. No.: 16/322,756

(22) PCT Filed: Jul. 24, 2017

(86) PCT No.: PCT/EP2017/068627
§ 371 (c)(1),
(2) Date: Feb. 1, 2019

(87) PCT Pub. No.: WO2018/024526
PCT Pub. Date: Feb. 8, 2018

(65) Prior Publication Data
US 2019/0346374 A1    Nov. 14, 2019

(30) Foreign Application Priority Data

Aug. 4, 2016   (IT) .................. 102016000082297

(51) Int. Cl.
*G01N 21/90*         (2006.01)
*H04N 5/262*         (2006.01)
(Continued)

(52) U.S. Cl.
CPC ....... *G01N 21/9054* (2013.01); *G01N 21/909* (2013.01); *G01N 21/9036* (2013.01);
(Continued)

(58) Field of Classification Search
None
See application file for complete search history.

(56) References Cited

U.S. PATENT DOCUMENTS

| 5,900,945 A | 5/1999 | Hinata et al. |
| 2008/0001104 A1 | 1/2008 | Voigt et al. |

(Continued)

FOREIGN PATENT DOCUMENTS

| DE | 102012102073 A1 | 9/2013 |
| DE | 102014216576 A1 | 5/2016 |

OTHER PUBLICATIONS

International Search Report and Written Opinion for Application No. PCT/EP2017/068627 dated Dec. 6, 2017.

*Primary Examiner* — Talha M Nawaz
(74) *Attorney, Agent, or Firm* — Troutman Sanders LLP

(57) ABSTRACT

A continuous quality control device for containers in a roto-revolutionary movement consists of making said containers pass in front of lighting means, capturing by at least one single sequential image capturing device each of said containers in rotation, obtaining an optical reconstruction of said containers and controlling their quality according to said optical reconstruction, characterised in that said lighting means is equipped with stroboscopic control means that allows the illumination of said containers in counterphase from at least two different angles of incidence and the capturing of at least two overlapping images in the same angular rotation position of said container in its own housing with respect to said image capturing device.

13 Claims, 6 Drawing Sheets

(51) Int. Cl.
H04N 5/225 (2006.01)
G01N 21/84 (2006.01)
(52) U.S. Cl.
CPC ......... *H04N 5/2256* (2013.01); *H04N 5/2625* (2013.01); *G01N 2021/845* (2013.01)

(56) References Cited

U.S. PATENT DOCUMENTS

| | | |
|---|---|---|
| 2008/0292178 A1 | 11/2008 | Sones et al. |
| 2014/0119634 A1 | 5/2014 | Numazu |
| 2014/0125793 A1 | 5/2014 | Kurosawa et al. |
| 2015/0229898 A1* | 8/2015 | Rivard .................. H04N 9/045 348/223.1 |
| 2016/0139774 A1* | 5/2016 | Rivard ................ G06F 3/04842 715/781 |
| 2016/0323518 A1* | 11/2016 | Rivard .................. H04N 5/247 |
| 2018/0353828 A1* | 12/2018 | Otten .................. G01B 5/0023 |

* cited by examiner

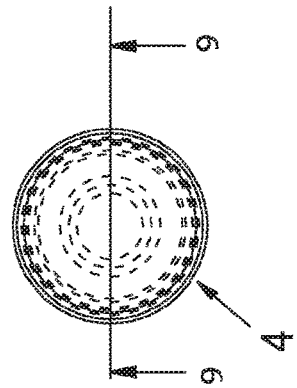
FIG. 7
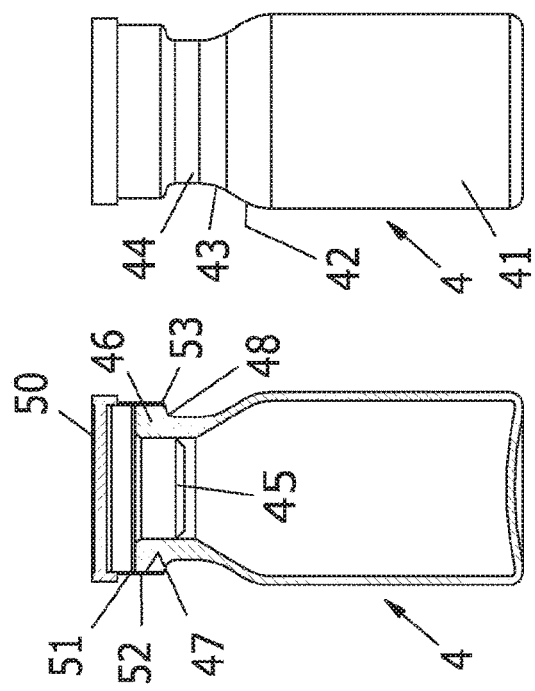
FIG. 8
FIG. 9
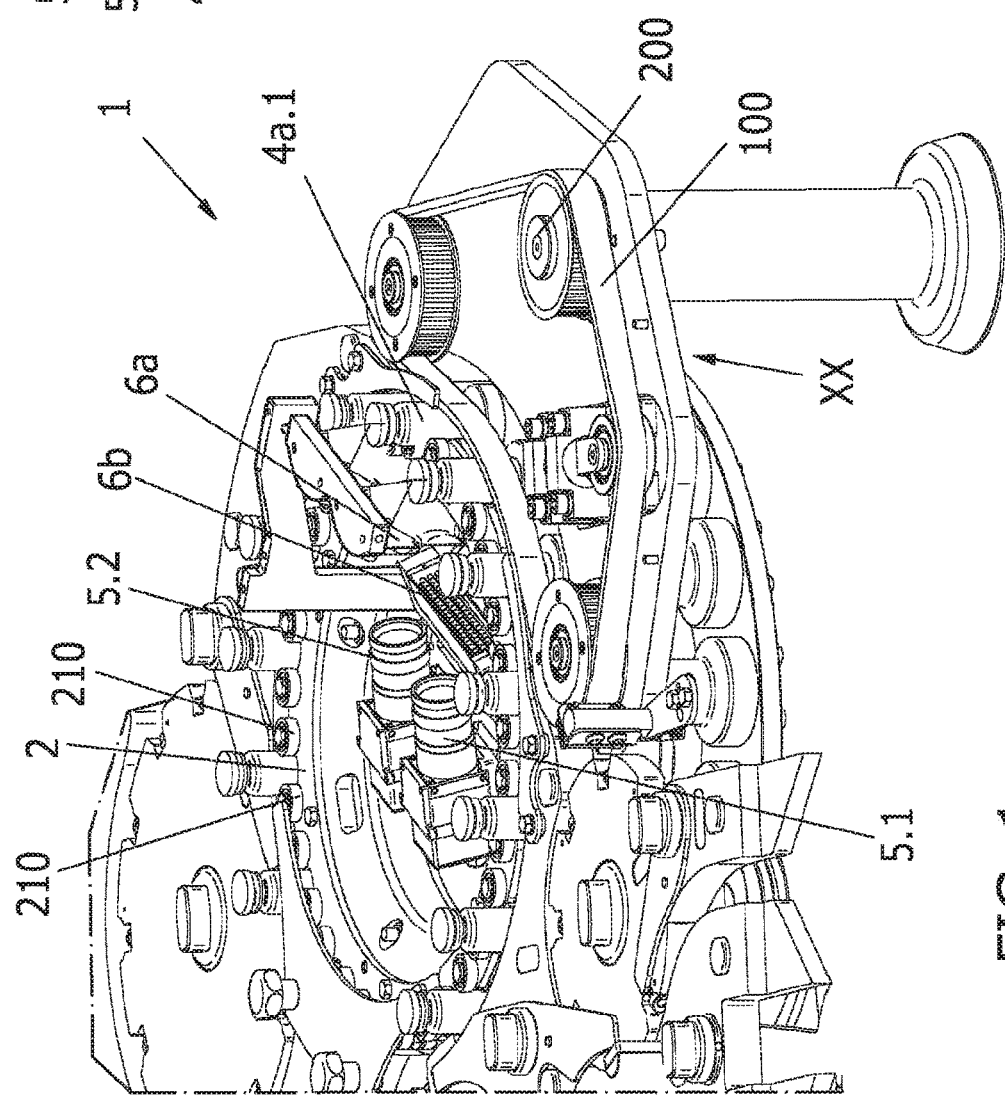
FIG. 1

DEVICE FOR THE CONTINUOUS QUALITY CONTROL OF CONTAINERS

CROSS-REFERENCE TO RELATED APPLICATION

This application is the National Stage of International Application PCT/EP2017/068627 filed Jul. 24, 2017 and published as WO 2018/024526 on Feb. 8, 2018. The International Application claims priority to Italian Application No. 102016000082297. All of the above applications are incorporated herein by reference in their entirety.

FIELD OF THE INVENTION

As is known, there are currently different types of quality control devices on the market for semitransparent or opaque containers, generally cylindrical, empty or full, open or provided with closing systems.

BACKGROUND

Quality control devices for containers are also known based on optical systems that allow the optical reconstruction of the containers by means of in-sequence capturing devices of successive angular sectors of the container placed in rotation or rota-revolution, where such plurality of views and the number of images captured are handled through handling means during the movement of the container.

Quality control devices are also known that operate independently on a production line.

Such machines are normally equipped with fixed TV cameras in front of which the container transits in rotation and a lighting device with a pre-established angle of incidence adapted to maximize the quantity of reflected light and therefore the possibility of resolution of the plurality of images handled for the optical reconstruction of the entire side surface of the container.

Such machines are however characterized by limited productivity and the imprecision of the optical reconstruction of the container in the case of side walls of the container—or portions of the side walls—that have concave and/or convex surfaces on which the angle of incidence of the light of the lighting device and therefore the angle of reflection vary, generating shaded zones of lower optical resolution and therefore imprecision of the reading of the image and optical reconstruction of the container.

In particular, such imprecisions become unacceptable for the quality control of closures of containers through mechanical crushing to deform the closing element, generally metal or another ductile material, onto a container contrast element, generally cylindrical.

Such operation, known in technical jargon as "crimping", typically used for sealed containers in the pharmaceutical industry but not only, generates surfaces at high mutual angles, even orthogonal, and undercuts in the specific closing area where the profoundly different angles of reflection of the light generated by the lighting device placed at a fixed angle with respect to the container prevent the correct, reliable and complete optical reconstruction of the closing element subjected to quality control.

SUMMARY

The task proposed by the present invention is to devise a quality control device and process for containers that solves the drawbacks of the prior art mentioned above.

Within the scope of this task, the object of the invention is to devise a quality control device and process for containers that is not expensive either from a structural or management point of view.

A further object of the invention is to provide a quality control device and process for containers that allows the entire side surface of a container even with deeply concave and/or convex areas to be detected with extreme precision, with contained costs and with a single viewing point.

A further object of the invention is to provide a quality control device and process for containers that allows the entire surface of the sealed closures obtained by crimping the closure onto the container to be detected with extreme precision.

It is a further object of the invention to provide a quality control device and process for containers with high productivity, that offers all the advantages of viewing systems along with all the advantages of management cost and production of continuous control systems.

This task and other objects are reached by a continuous quality control device for containers comprising a rotating carousel having circumferentially a plurality of housings adapted to allow each container housed therein to make a rotation movement about its own vertical axis by means of rotation means, optical reconstruction means for reconstructing the characteristics of each of said containers being provided on said carousel which have lighting means for lighting said container and a capturing device for capturing multiple sequential images of said container during its rota-revolutionary movement, characterized in that said optical reconstruction means is rigidly and successively connected with an angular position of said rotating carousel during its rotation connected with the angular and sequential position of each of said housings of said containers, in that synchronization means synchronizes said captured images and said angular positions of said carousel and of said housings of said containers, in that said lighting means comprises at least two lights which illuminate said containers from at least two different angles of incidence, said lighting means being equipped with stroboscopic control means which allows the lighting and capturing by said capturing device for capturing sequential images of at least two of said images of said container overlapping in the same angular rotation position of said container in its own housing with respect to said image capturing device.

The subject matter of the invention is also a continuous quality control process for containers in a roto-revolutionary motion consisting of making said containers transit in front of lighting means, capturing by one single sequential image capturing device each of said containers in rotation, obtaining an optical reconstruction of said containers and checking their quality according to said optical reconstruction, characterized in that said lighting means is equipped with a stroboscopic control means that allows the illumination of each container in counterphase from at least two different angles of incidence and the capturing of at least two overlapping images in the same angular rotation position of said container in its own housing with respect to said image capturing device.

The subordinate claims specify more clearly further characteristics of the device according to the invention and in particular that the lighting devices are positioned with respect to the container with two different angles of incidence placed in the same plane intersecting the vertical axis of the container, and that said lighting means is integral in angular rotation with said multiple sequential image capturing device.

The capturing device captures in sequence successive angular sectors of the container in rotation, and such plurality of views is handled by means of optical handling means for having the optical reconstruction of the same container and being able to perform quality control thereof in its entirety and/or of particular areas of specific interest, such as typically but not limited to the "crimping" area of the closure onto the container.

BRIEF DESCRIPTION OF THE DRAWINGS

Further characteristics and advantages of the invention will more fully emerge from the description of a preferred but not exclusive embodiment of a quality control device and process for containers according to the invention, illustrated by way of indicative and non-limiting example in the accompanying drawings, in which:

FIG. 1 is a schematic perspective view of the continuous quality control device and process for containers according to the invention, in which the lighting means and the capturing device are positioned inside the carousel with respect to the containers in the circumferential housings;

FIG. 7 shows a plan view of the container with a crimped closure;

FIG. 8 shows a lateral elevation view of the container; and

FIG. 9 shows a section of the container along line 9-9 of FIG. 7.

DETAILED DESCRIPTION

Figure 4:
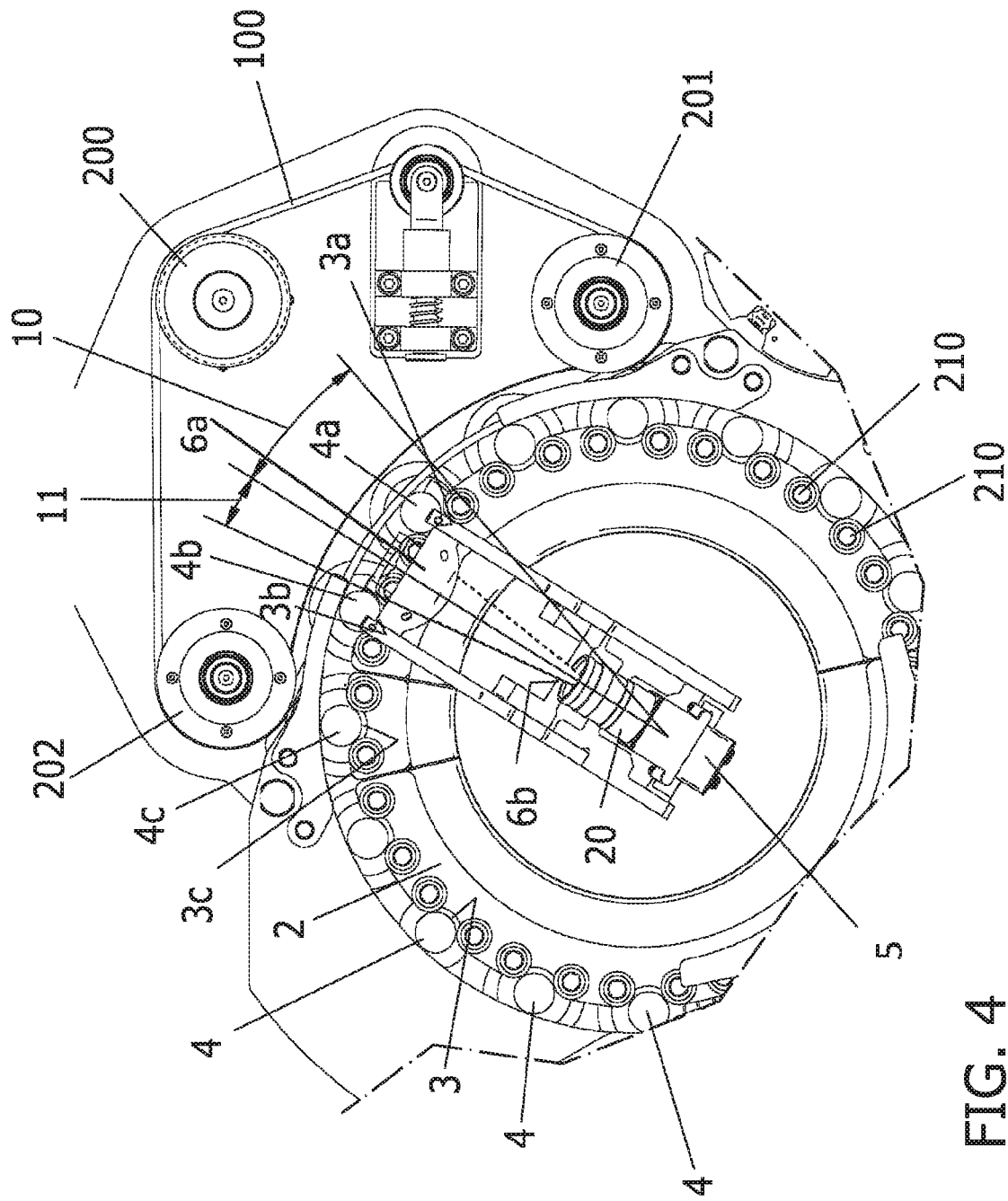
FIG. 4 shows a plan view of a variant of the device appearing in FIG. 1, in which a single capturing device is provided.

With particular reference to FIG. 4, the orientation and quality control device for containers is indicated overall by number 1.

The device 1 comprises a rotating carousel 2 having circumferentially a plurality of housings 3, 3a, 3b, 3c adapted to allow each container 4, 4a, 4b, 4c housed in such housings 3, 3a, 3b, 3c to rotate about its own axis by means of a rotation means described below, and therefore to impail a roto-revolutionary movement to each container 4, 4a, 4b, 4c.

The containers 4, 4a, 4b, 4c, may be, by way of example, made of glass, polyethylene terephthalate (PET), transparent, opaque, of a cylindrical conformation or other conformations, labelled or not, empty or full, open or provided with closing systems.

Within the carousel 2 and independently thereof, an optical reconstruction means 5 is housed for reconstructing the characteristics of each of the containers housed in the housings 3, 3a, 3b, 3c, comprising a lighting means 6a, 6b for lighting the container 4, 4a, 4b, 4c, and a capturing device 20 for capturing multiple sequential images.

Such optical reconstruction means 5 can rotate in synchrony with the carousel 2, being able in particular to be coupled to each of the angular positions of the housings 3, 3a, 3b, 3c of the containers 4, 4a, 4b, 4c, and being able to follow it for the angular sector 10 of the rotation of the carousel 2 in which the container 4, 4a, 4b, 4c performs at least one complete 360° rotation in its rotatory translation movement; the amplitude of the angular sector 10 is inversely proportional to the complete 360° rotation speed of the container 4, 4a, 4b, 4c, in its housing 3, 3a, 3b, 3c. Once this complete rotation step of the container 4, 4a, 4b, 4c has been performed, such optical reconstruction means 5 rotates in the opposite direction with respect to the carousel 2, hence coupling the angular position of the previous housing on the carousel 2 in which the subsequent container to be checked is housed, which is sequentially subjected to the same optical reconstruction process as the previous container.

In the synchronous rotation step with the carousel 2, the optical reconstruction means 5 rotates at the same constant speed as the carousel 2, while in the rotation step in the opposite direction for coupling the position of the previous housing on the carousel 2, the rotation speed of the optical reconstruction means is the maximum permitted by the characteristics of the mechanics, the inertia of the components and the mutual coupling means of the positions and the speeds.

The higher the rotation speed in the opposite direction, the shorter the time required for coupling the previous position of the housing and therefore, at a constant rotation speed of the carousel 2, the smaller the angular sector 11 travelled by the carousel 2 during the re-coupling step of the optical reconstruction means 5 on the previous position of the housing of the subsequent container.

With the other parameters kept the same, the sum of the angular sector 10 and the angular sector 11 determines the pitch of the positions of the housings on the circumference of the carousel 2.

It is clear that a smaller angular sum of the angular sectors 10 and 11 corresponds to a smaller pitch of the positions of the housings on the circumference of the carousel 2, and therefore with the same diameter of the carousel 2 there is a higher number of housings for containers to be checked.

A synchronization means synchronizes the images sequentially captured by the capturing device 20 with the angular position of the rotating carousel 2 and with the angular position of the container in its rotation in the housing, allowing any faults on the container to be localized and the corresponding container subjected to quality control to be identified.

The lighting means of the container is comprised by at least two lights 6a and 6b that illuminate the container from two different angles of incidence, preferably one from above and one from below with respect to the horizontal plane of the carousel 2.

Preferably, such angles lie in the same vertical plane identified by the vertical axis of rotation of the container 4, 4a, 4b, 4c.

The lighting means 6 is equipped with a stroboscopic control means, which allows the lighting of the container 4, 4a, 4b, 4c alternatively and in counterphase with the light 6a and the light 6b.

The illumination of the light 6a with an angle of incidence typically from above with respect to the container highlights more clearly the concave or convex surfaces facing upwards, while the illumination of the light 6b with an angle of incidence typically from below with respect to the container highlights more clearly the concave or convex surfaces facing downwards.

The capturing means 20 for capturing sequential images therefore successively captures a pair of images of the container 4, 4a, 4b, 4c of which one image highlights more the surfaces facing upwards and one image highlights more the surfaces facing downwards of the container 4, 4a, 4b, 4c.

The synchronizing means and the stroboscopic control means act in a coordinated way to allow the capturing means 20 to capture such pair of images in an extremely reduced time with respect to the angular rotation of the container 4, 4a, 4b, 4c in the housing 3, 3a, 3b, 3c, such as to be able to make the optical reconstruction means 5 consider such pair of images as images relating to the same angular exposure of the container with respect to the capturing means 20.

The optical reconstruction means 5 then overlaps such pair of images, reconstructing a single image of the container 4, 4a, 4b, 4c in the respective angular position with respect to the capturing means 20.

The continuous, coordinated and sequential activation of the capturing means 20, of the lighting means 6a, 6b, of the stroboscopic control means, of the synchronizing means during the at least 360° rotation of a container 4, 4a, 4b, 4c in its housing 3, 3a, 3b, 3c circumferential to the carousel 2, allow the optical reconstruction means 5 to optically and accurately reconstruct the whole surface of the container, also in particular concave and/or convex areas.

Such innovative performance of the present invention is particularly advantageous for the quality control of the closures of containers 4, 4a, 4b, 4c obtained through mechanical crushing for the deformation of the closure element, generally made of metal or another ductile material, on a contrast element of the container, generally cylindrical, an operation defined in technical jargon as "crimping".

With reference to FIGS. 7-9, a typical container 4 is shown which has a cylindrical main outer surface 41, two respectively convex 42 and concave 43 areas for connecting with the cylindrical area 44 having a shorter diameter than the area 41 leading towards the upper opening 45 of the container.

The opening 45 is externally surrounded by an enlarged section contrast element 46 of the material of the container 4, on which the crimping operation of the closure 50 takes place, through the forced mechanical deformation of the edge 51 onto the contrast element 46, both on the vertical surface 47 of the contrast element 46 for the portion of the edge 52 and on the sub-horizontal area 48 of the contrast element 46 for the portion of the edge 53.

The quality control to which a container 4 provided with a crimped closure 50 is subjected, is therefore particularly related but not limited to the optical reconstruction of the portions 52 and 53 of the closing edge 51.

By means of the innovative device disclosed by the invention, during the control operations, the lighting of the light 6a with an angle of incidence typically from above with respect to the container 4 more greatly highlights the concave 43 or convex 42 surfaces of the container 4 facing upwards as well as the edge 52 of the closure element 50, of which the capturing means 20 captures an image.

The successive lighting in counterphase of the light 6b with an angle of incidence typically from below the container 4 more greatly highlights the surfaces of the sub-horizontal area 48 and of the edge 52 of the closing element 50 facing downwards, of which the capturing means 20 captures an image.

The synchronizing means and the stroboscopic control means act in a coordinated way to allow the capturing means 20 to capture such pair of images in an extremely reduced time with respect to the angular rotation of the container 4 in the housing 3 such as to be able to make the optical reconstruction means 5 consider such pair of images as images relating to the same angular exposure of the container 4 with respect to the capturing means 20.

Then the optical reconstruction means 5 overlaps such pair of images, reconstructing a single image of the container 4, particularly highlighting the concave 43 or convex 42 surfaces facing upwards beyond the edge 52 of the closing element 50, and the surfaces of the sub-horizontal area 48 of the edge 52 of the closing element 50 facing downwards, in the respective angular position with respect to the capturing means 20.

The continuous, coordinated and sequential activation of the capturing means 20, of the lighting means 6a, 6b, of the stroboscopic control means, of the synchronizing means during the at least 360° rotation of a container 4 in its housing 3 circumferential to the carousel 2, allow the optical reconstruction means 5 to optically and accurately reconstruct the whole surface of the container 4, particularly highlighting the areas affected by the crimping of the closure 50 onto the contrast element 48 of the container 4.

Figure 2:
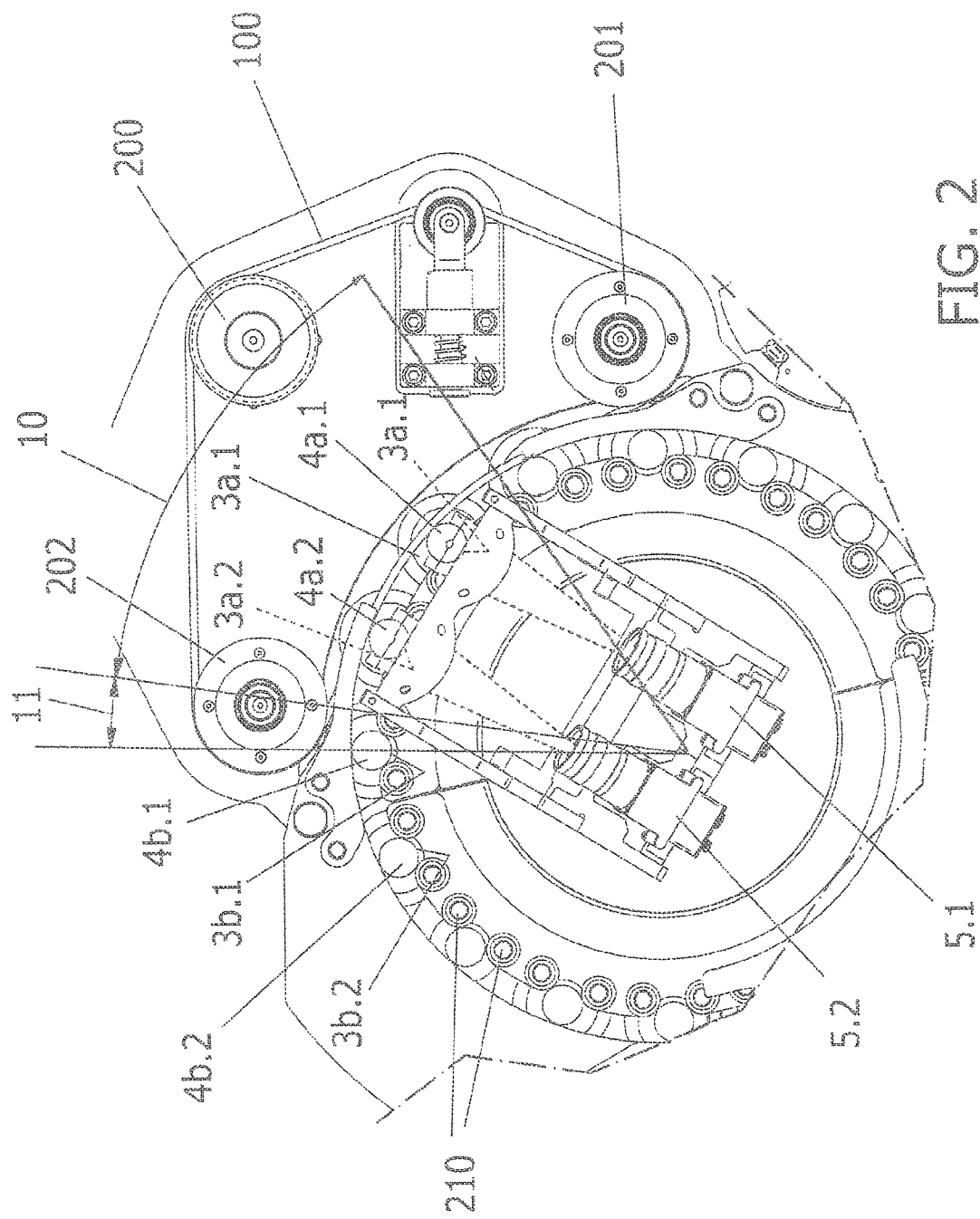
FIG. 2 is a plan view of the device appearing in FIG. 1.
Figure 3:
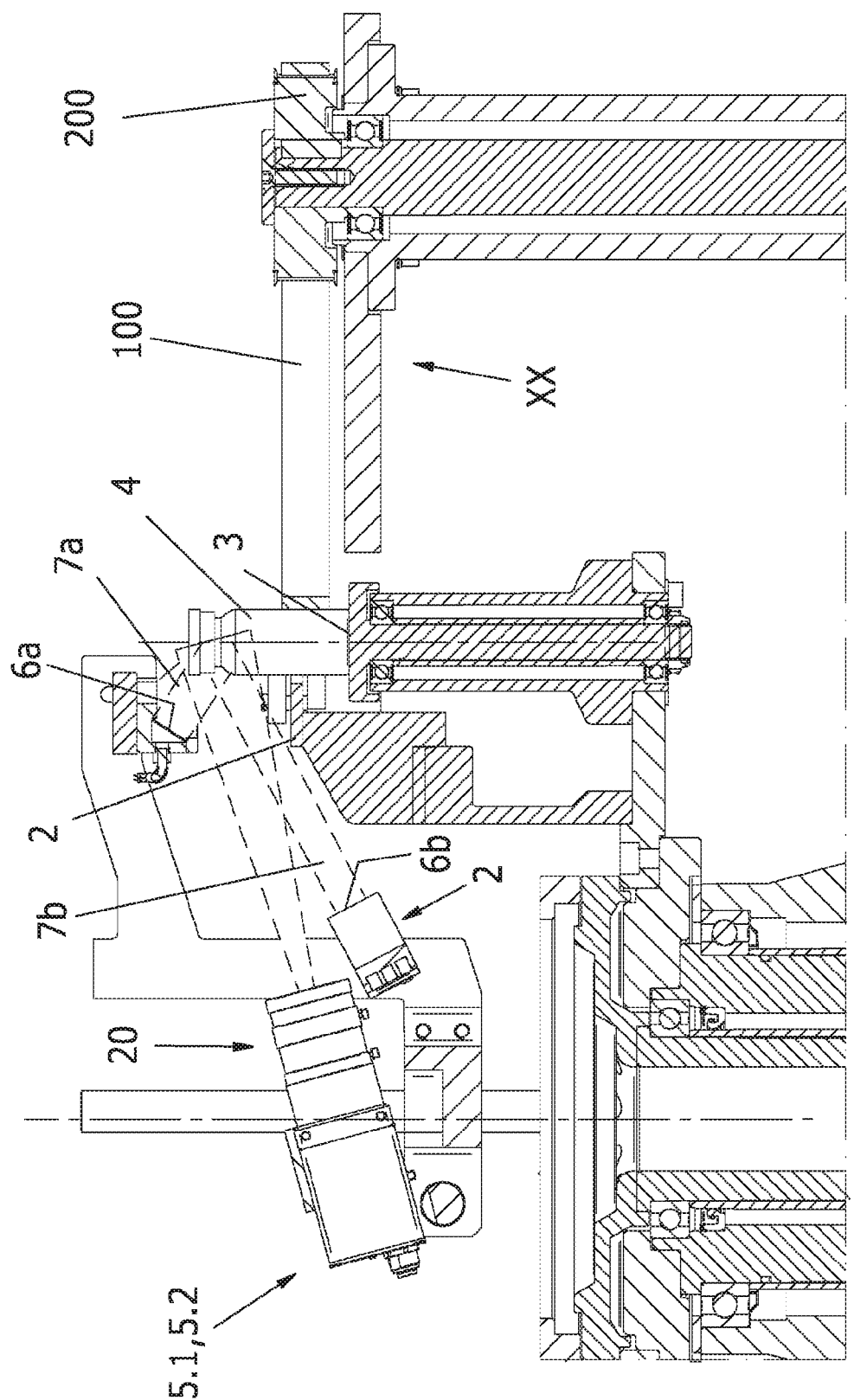
FIG. 3 is a vertical sectional view of the device appearing in FIG. 1.

Another preferred but not exclusive solution for the realization of the present invention is shown in FIGS. 1-3.

FIGS. 1-3 show a quality control device 1 for containers equipped with a pair of optical reconstruction means, respectively indicated in the figures by the numbers 5.1 and 5.2, mutually integral in angular rotation inside the rotating carousel 2.

Also in this case, the lighting means 6 for lighting the container is comprised by at least two lights 6a and 6b that illuminate the container from two different angles of incidence 7a, 7b, preferably one from above and one from below with respect to the horizontal plane of the carousel 2.

Such optical reconstruction means 5.1 and 5.2 can rotate in synchrony with the carousel 2, being able in particular to be coupled to each of the angular positions of the housings 3a.1 and 3a.2 of the containers 4a.1 and 4a.2, and being able to follow it for the angular sector 10 of the rotation of the carousel 2 in which the container 4a.1 and 4a.2 performs at least one complete 360° rotation in its rotatory translation movement; the amplitude of the angular sector 10 is inversely proportional to the complete 360° rotation speed of the container 4a.1 and 4a.2, in its housings 4a.1 and 4a.2.

Once this complete rotation step of the container 4a.1 and 4a.2 has been performed, such pair of rigidly integral optical reconstruction means 5.1 and 5.2 rotates in the opposite direction with respect to the carousel 2, hence coupling the angular position respectively of the previous pair of housings 3b.1 and 3b.2 on the carousel 2 in which the subsequent pair of containers 4b.1 and 4b.2 to be checked is housed, which are sequentially subjected to the same optical reconstruction process as the previous pair of containers 4a.1 and 4b.1.

It appears clear how in the rotation step in synchrony with the carousel 2, the optical reconstruction means 5.1 and 5.2 turning at the same constant speed as the carousel 2, and travelling through the angular sector 10, optically reconstruct a pair of containers 4a.1 and 4a.2: with the same geometric dimensions as the rotating carousel 2 and the rotatory translation speed of the containers this allows the pitch of the positions of the housings on the circumference of the carousel 2 to be halved, and therefore, in the same conditions, the productivity of the control device according to the invention to be doubled.

The rotation means for rotating the containers in their housings in the rotating carousel 2 is made in two preferential but not limiting embodiments.

FIGS. 1-4 represent rotation means xx for rotating the containers in their housing through direct action of the flexible belt 100 on the side surface 41 of the container 4, 4a, 4b, 4c; the flexible belt 100 is faced and placed in rotation by the pulley 200 activated by a rotation means not described and maintained tight by the free wheels 201 and 202 in contrast on the side walls 41 of the containers; the containers placed in the housings are each maintained in position by at least a pair of contrast means 210 free to rotate about an axis parallel to the axis of rotation of the container; during the rotation of the flexible belt 100 the contrast of the side surface of the flexible belt 100 on the side wall 41 causes the rotation of the container in the housing; the sizing of the rotation means xx and the coordination of the rotation speed of the rotating carousel 2 and of the pulley 200 allow the complete at least 360° rotation on its own axis of the container 4 in the rotation of the rotating carousel 2 for at least the capturing sector 10 for capturing multiple sequential images of the optical reconstruction means 5, 5.1, 5.2.

Figure 5:
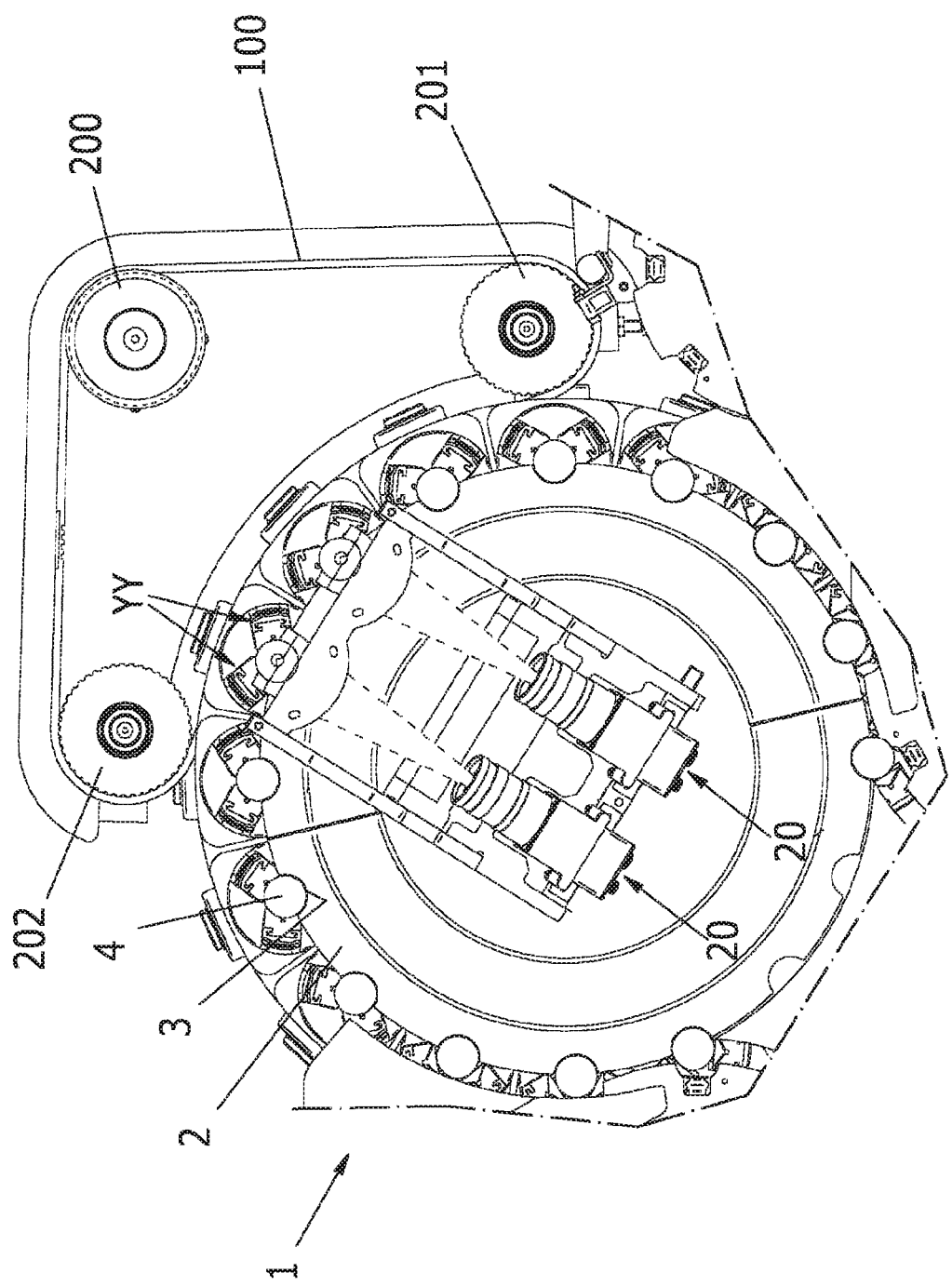
FIG. 5 shows a plan view of a variant of the device appearing in FIG. 1, in which a different means is provided for rotating the containers in their housing.
Figure 6:
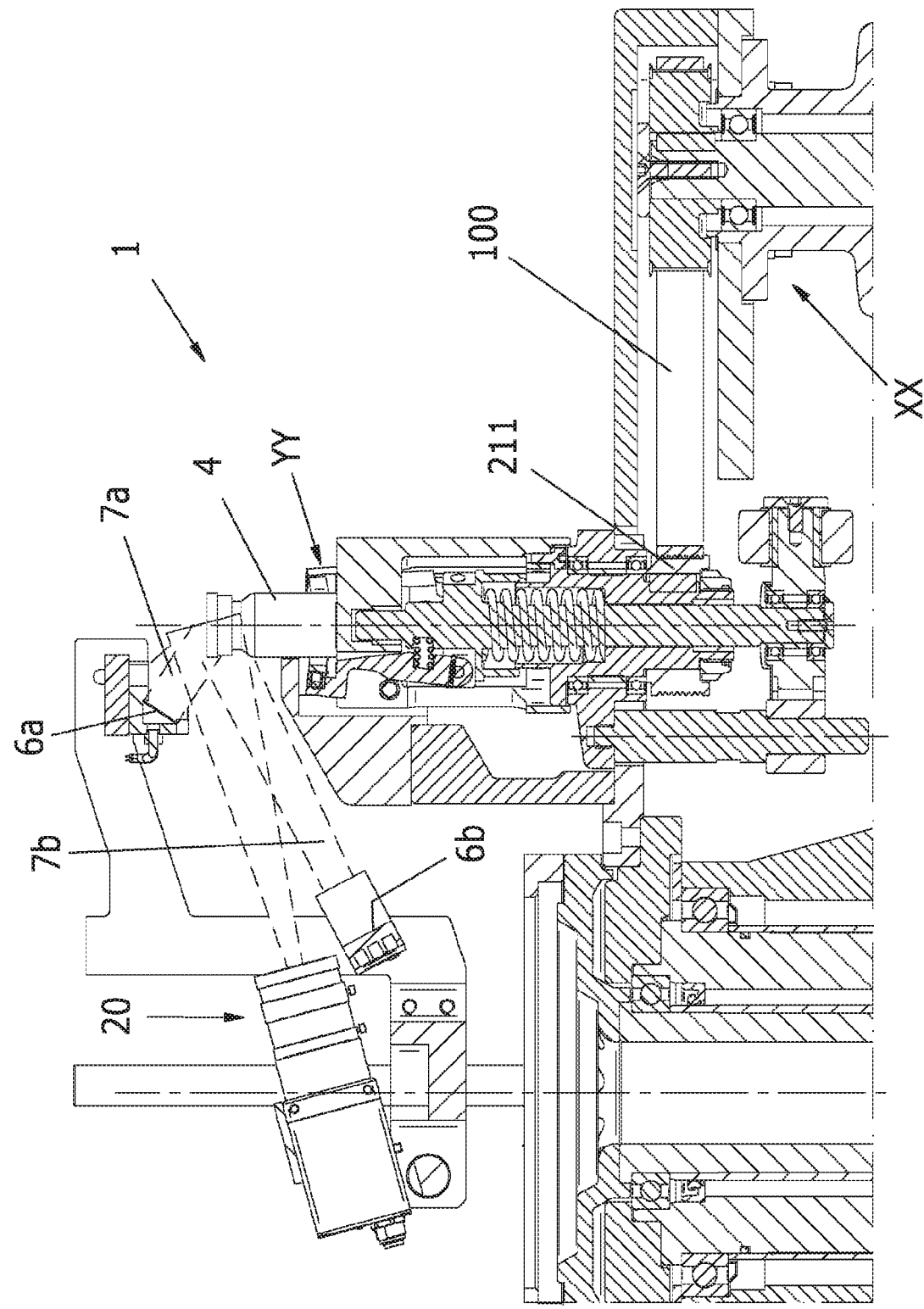
FIG. 6 shows a vertical section of the device appearing in FIG. 5.

Other rotation means for rotating the containers in their housing in the rotating carousel 2 are schematically illustrated in FIGS. 5 and 6.

Also in this case, it can be noted that the capturing means 20 and the lighting means for lighting the container 4 are comprised by at least two lights 6a and 6b that illuminate the container 4 from two different angles of incidence 7a, 7b, preferably one from above and one from below with respect to the horizontal plane of the carousel 2.

The containers 4 are rigidly retained by elastically actuated retention means yy free to rotate about their own vertical axis in their own housing of the rotating carousel 2; the flexible belt 100 of the rotation means xx is maintained tight by the free wheels 20 I and 202 in contrast on the side wall of a cylindrical element 211 of the elastic retention means yy; during the rotation of the flexible belt 100 the contrast of the side surface of the flexible belt I 00 on the side wall of the cylindrical element 211 causes the rotation of the elastic retention means yy in the housing 3 and with it of the rigidly retained container 4.

The sizing of the rotation means xx and the coordination of the rotation speed of the rotating carousel 2 and of the pulley 200 allow the complete at least 360° rotation on its own axis of the elastic retention means yy in the housing 3 and with it of the rigidly retained container 4 in the rotation of the rotating carousel 2 for at least the angular sector for capturing the multiple sequential images of the optical reconstruction means 5.

The subject matter of the present invention is also and not only a continuous quality control process for containers in a roto-revolutionary movement consisting of making said containers pass in front of lighting means in a rotatory movement, capturing by at least one capturing device consecutive sequential images of each of said containers in rotation, obtaining an optical reconstruction of said containers and checking their quality according to said optical reconstruction, characterized in that said lighting means is equipped with a stroboscopic control means that allows the illumination of said containers in counterphase from at least two different angles of incidence and the capturing of at least two overlapping images in the same angular rotation position of said container in its own housing with respect to said image capturing device.

The characteristics and operation of the continuous quality control device for containers according to the invention appear clear from what has been described and illustrated.

The device as it is conceived is susceptible to numerous modifications and variants, all falling within the scope of the inventive concept.

In particular, the optical reconstruction means, in the event in which the carousel has a very reduced diameter, may be placed not radially internally to but radially externally to it.

Moreover, all details may be replaced with other technically equivalent elements. In practice the materials used, as well as the dimensions, can be any according to the needs and the state of the art.

The invention claimed is:

1. A continuous quality control device for containers comprising:
    a rotating carousel comprising, circumferentially a plurality of housings adapted to allow each container housed therein to make a rotation movement about its own vertical axis by means of rotation device,
    an optical reconstruction device reconstructing the characteristics of each of said containers being provided
    a lighting device lighting said container and
    a capturing device capturing multiple sequential images of said container during its rota-revolutionary movement,
    wherein said optical reconstruction device is rigidly connected with subsequent angular positions of said rotating carousel during its rotation, said angular positions being connected with the angular and sequential position of each of said housings of said containers,
    a synchronization device synchronizes said captured images and said angular positions of said carousel and of said housings of said containers,
    wherein said lighting device comprises:
        at least two lights which illuminate each container from at least two different angles of incidence,
        a stroboscopic control which allows the lighting and capturing by said capturing device of sequential images of at least two of said images of said container overlapping in the same angular rotation position of said container in its own housing with respect to said image capturing device.

2. The continuous quality control device for containers according to claim 1 wherein said lighting device equipped with the stroboscopic control sequentially illuminates said container in counterphase with said at least one light and said at least one light.

3. The continuous quality control device for containers according to claim 1 wherein in that said two respectively different angles of incidence are located in the same plane intersecting the vertical axis of said container.

4. The continuous quality control device for containers according to claim 1 wherein that said lighting device is integral in angular rotation with said multiple sequential image capturing device.

5. The continuous quality control device for containers according to claim 1 wherein in that said multiple sequential image capturing devices and said lighting device capture multiple sequential images of each of said containers in their said housing during at least one complete 360° rotation movement of said container about its vertical axis.

6. The continuous quality control device for containers according claim 1 wherein that said multiple sequential image capturing devices and said lighting device are suitable for capturing multiple sequential images of the "crimped" closure of each of said containers.

7. The continuous quality control device for containers according to claim 1 wherein that said carousel is equipped with at least two of said optical reconstruction devices reciprocally integral in angular rotation.

8. The continuous quality control device for containers according to claim 1 wherein that said at least two optical reconstruction devices are rigidly connected during angular movement with the angular position of at least two of said adjacent and consecutive housings of said containers.

9. The continuous quality control device for containers according to claim 1 wherein that the rotation movement about its own axis of each of said containers in its own said housing of said rotating carousel is performed by a rotator by direct action on the side surface of said container in the circumferential rotatory translation of said rotating carousel.

10. The continuous quality control device for containers according to claim 1 wherein that said containers are rigidly retained by elastically actuated a retention device free to rotate about their own vertical axis in their own said housing of said rotating carousel.

11. The continuous quality control device for containers according to claim 10 wherein that said retention device is directly rotated by the action of said rotator on the side surface of the cylindrical element of said retention device in the circumferential rotatory translation of said rotating carousel.

12. The continuous quality control device for containers according to claim 11 wherein that said rotation device allows the complete 360° rotation on its own axis of said container in the rotation of said rotating carousel for at least the multiple sequential image capturing sector of said optical reconstruction device.

13. A continuous quality control device for containers in a roto-revolutionary movement consists of making said containers pass in front of lighting means, capturing by at least one single sequential image capturing device each of said containers in rotation, obtaining an optical reconstruction of said containers and controlling their quality according to said optical reconstruction, characterised in that said lighting means is equipped with stroboscopic control means that allows the illumination of said containers in counter-phase from at least two different angles of incidence and the capturing of at least two overlapping images in the same angular rotation position of said container in its own housing with respect to said image capturing device.

* * * * *